Oct. 26, 1943.  R. E. BAUER  2,332,837
STEADY REST
Filed March 12, 1941  2 Sheets-Sheet 1
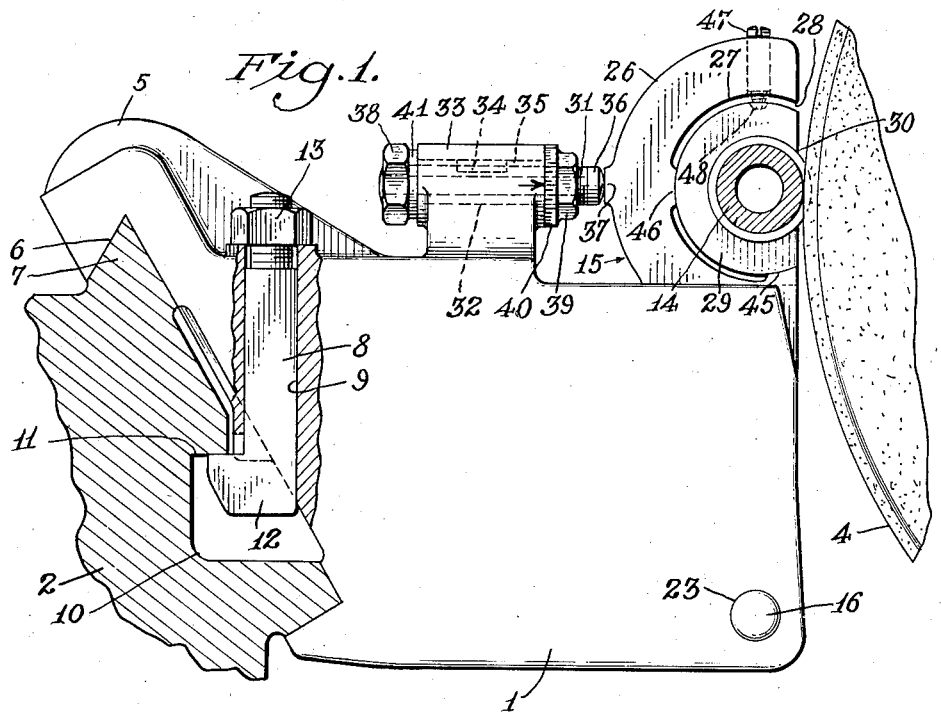
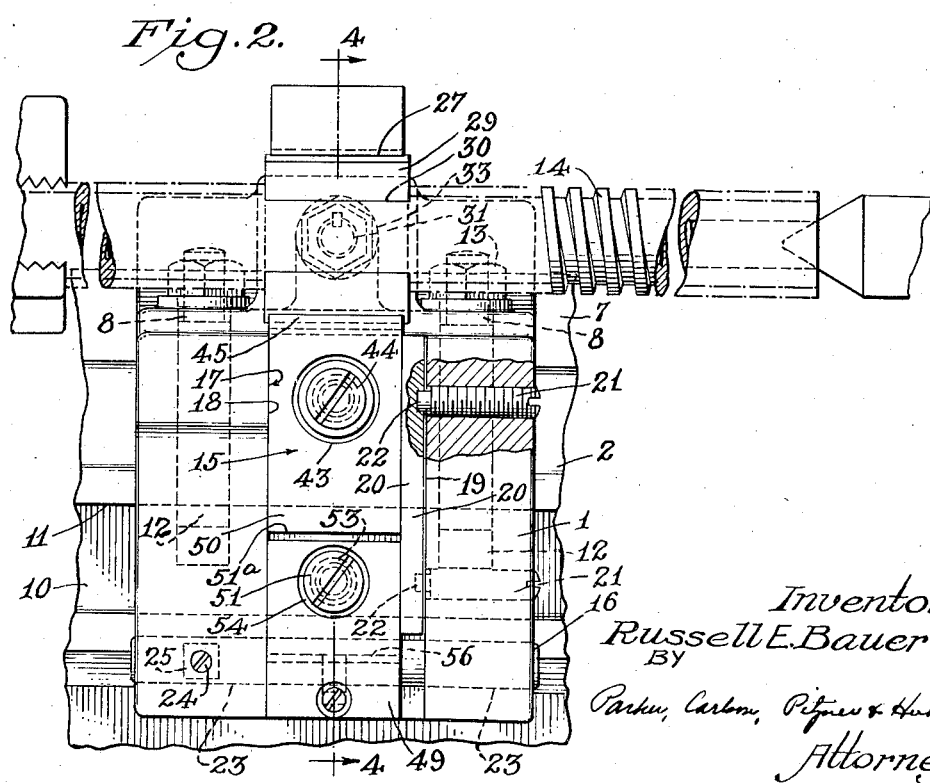
Inventor
Russell E. Bauer
BY
Parker, Carlson, Pitzner & Hubbard
Attorneys.

Oct. 26, 1943.  R. E. BAUER  2,332,837
STEADY REST
Filed March 12, 1941   2 Sheets-Sheet 2
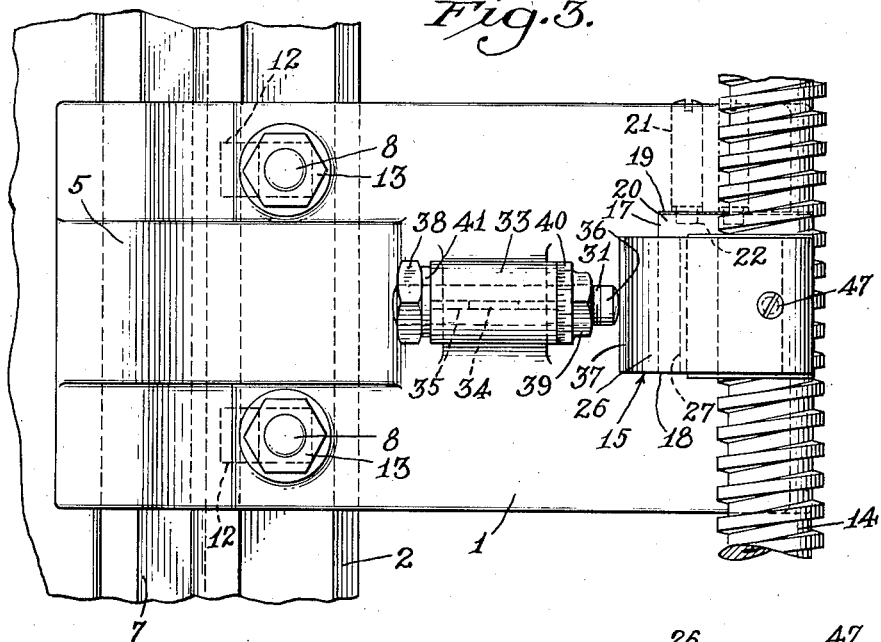
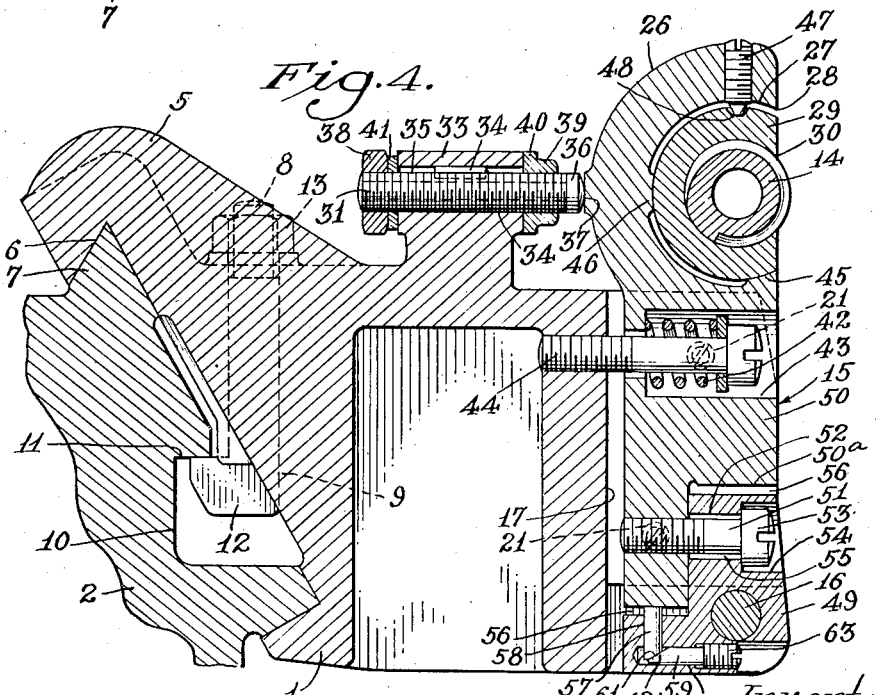
Inventor
Russell E. Bauer
BY
Parker, Carlson, Pitzner & Hubbard
Attorneys.

Patented Oct. 26, 1943

2,332,837

UNITED STATES PATENT OFFICE 2,332,837

STEADY REST

Russell E. Bauer, Detroit, Mich., assignor to Ex-Cell-O Corporation, Detroit, Mich., a corporation of Michigan Application March 12, 1941, Serial No. 382,884

7 Claims. (Cl. 51—238)

The present invention relates to improvements in steady rests adapted for use in machine tools, and has particular reference to a new and improved steady rest capable of use as an accessory support for long workpieces, such for example as a long lead screw.

One of the objects of the present invention is to provide a novel steady rest comprising a peripherally contractable guide bushing adapted to embrace a rotary work-piece, and to be adjusted into close fitting engagement therewith so as to prevent run-out and to insure accurate machining.

Another object is to provide a new and improved steady rest which is accurately and conveniently adjustable to accommodate workpieces of different sizes, and to permit a correct set-up for each workpiece.

Further objects and advantages will become apparent as the description proceeds.

In the accompanying drawings,

Figure 1 is a fragmentary side elevational view, partially in section, of a steady rest embodying the features of my invention.

Fig. 2 is a fragmentary end elevational view of the steady rest.

Fig. 3 is a fragmentary plan view.

Fig. 4 is a vertical sectional view taken substantially along line 4—4 of Fig. 2.

Referring more particularly to the drawings, the steady rest, constituting the exemplary embodiment of the invention, comprises a body 1 adapted to be adjustably mounted on a work support, such for example on a carriage 2 reciprocable on a machine base (not shown) in operative relation to a grinding wheel 4. In the present instance, the body 1 is formed with a base bracket 5 having a guideway 6 in the under face slidably engaging a complementary longitudinal guide 7 on the carriage 2. Both the guideway 6 and the guide 7 are laterally inclined; and of each, the lower edge is square and the upper edge is dovetailed.

To secure the steady rest in selected position of adjustment on the guide 7, two clamp bolts 8 are extended through two spaced holes 9 opening from the root of the guideway 6 adjacent opposite ends vertically through the body 1. A longitudinal groove 10 is formed in the guide 7 between the guide edges, and defines a downwardly facing clamping surface 11. Each bolt 8 is formed at the lower end with a laterally projecting hook or lug 12 disposed for engagement with the clamping surface 11, and is adapted to be tightened by means of a clamp nut 13 threaded onto the upper end.

The steady rest is provided as an intermediate support for a long rotary workpiece 14 adapted to be supported at opposite ends by any suitable or conventional means (not shown) on the carriage 2. It is particularly adapted as a rest for long screws which are to have a screw thread ground thereon by the grinding wheel 4.

A generally vertical arm or lever 15 is mounted on the free end of the body 1, facing the grinding wheel 4, for substantially horizontal adjustment laterally of the guideway 6. Preferably, the lever 15 is supported at its lower end on a pivot pin 16, and is guided for pivotal adjustment about the pin in a vertical slot 17 in the body 1. The slot 17 has flat parallel sides 18 and 19, and a flat hardened clamping plate 20 is snugly interposed between the side 19 and the adjacent side of the lever 15. A plurality of spaced screws 21 are adjustably threaded in the body 1 through the side 19 of the slot 17, and engage at their inner ends in recesses 22 formed in the outer side of the plate 20.

The pivot pin 16 is non-rotatably supported at opposite ends in aligned bores 23 formed in the body 1 at opposite sides of the slot 17. A set screw 24 is threaded into one of the bores 23 for engagement with a flat area 25 on the pin 16 to secure the latter against rotation and endwise removal.

Thus, the arm or lever 15 is pivotally adjustable about its lower end in the slot 17 with a snug sliding fit between the sides 18 and the plate 20. The screws 21 serve to hold the plate 20 in assembled position, and are adapted to be tightened to clamp the plate against the lever 15 to lock the latter accurately in location against the side 18.

The free upper end of the lever 15 is formed with a rigid arcuate segment 26 opening toward the grinding wheel 4. This segment is in the form of a partial sleeve constituting a holder, with a bore 27 cut away longitudinally at one side to provide an opening 28 permitting entry of the cutting periphery of the grinding wheel 4. Adjustably secured within the bore 27 is a substantially concentric split bushing 29 adapted to embrace the periphery of the workpiece 14. More particularly, the bushing 29 is cut away longitudinally at one side to provide a split or opening 30 in registration with the opening 28. A portion of the periphery of the workpiece 14 is adapted to project through the opening 30 a sufficient extent for full depth engagement by the grinding wheel 4.

When the parts are accurately adjusted, the split bushing 29 is located concentrically about the axis of the workpiece 14. Pivotal movement of the lever 15 about the pin 16 affords a lateral adjustment substantially in the plane of the axes of the grinding wheel 4 and the workpiece 14. Although such movement is pivotal in character, the adjustment of the free end of the lever 15 is substantially rectilinear. The adjustment constitutes one component of movement for locating the axis of the bushing 29 in coincidence with the axis of the workpiece 14.

Means is provided for conveniently and accurately adjusting the lever 15 and for locating it positively in adjusted position against the thrust of the grinding action. In the present instance, this means comprises a screw 31 extending through a bore 32 in a lug 33 on the body 1. To hold the screw 31 against rotation, a key 34 is set therein, and slidably engages a longitudinal keyway 35 formed in the bore 32. The screw 31 extends perpendicularly to the pivot axis 16 of the lever 15 in the plane of the axes of the workpiece 14 and grinding wheel 4, and is provided on the rear end with a rounded stop button 36 adapted for engagement by a flattened projection 37 on the arcuate holder 26. Two nuts 38 and 39 are threaded onto the screw 31 respectively at opposite ends of the lug 33, and the nut 39 is provided with a micrometer dial 40 coacting with a fixed reference line on the lug. A washer 41 is interposed between the lug 33 and the nut 38. When the nut 38 is loosened, the nut 39 may be rotated to adjust the axial position of the stop button 36, and the position will be accurately identified by the micrometer dial 40. Thereafter, the nut 38 may be tightened to lock the screw 31 securely in adjusted position.

The projection 37 is held yieldably against the stop button 36 during adjustment of the screw 31 by means of a coiled compression spring 42 seated in a transverse bore 43 in the lever 15 between the pivot pin 16 and the holder 26. A cap screw 44 extends axially through the spring 42 and the lever 15 into threaded engagement with the body 1, and engages the free end of the spring to maintain the latter adjustably under compression against the lever.

Split bushings 29 of different internal diameters may be used interchangeably for work pieces 14 of different diameters. Each bushing 29, however, is yieldable in character so as to be adjustable by peripheral expansion and contraction to accommodate workpieces 14 of different diameters within a limited range. To this end, the bushing 29 is secured by three point contact within the bore 27 of the holder 26. Two of these points comprise fixed peripherally spaced projections 45 and 46 formed in the bore 27. One of these projections engages one split edge portion of the bushing 29, and the other engages the bushing at an intermediate point. The third point of support is provided by an adjustable set screw 47 threaded radially through the end of the holder 26 into engagement with the other split end portion of the bushing 29. In the present instance, the inner end of the set screw 47 is conical and engages in a socket 48 in the bushing 29 so as to maintain the latter in proper angular position. By tightening the screw 47, the internal diameter of the bushing 29 can be contracted to fit closely and uniformly about the embraced portion of the workpiece 14, and thereby to provide a good intermediate support or rest for the workpiece to prevent run-out.

When the bushing 29 is expanded or contracted, its curvature is altered, and its axis may be out of coincidence with the work axis. In this event, it is necessary to move the bushing into proper coaxial relationship with the workpiece. One component of movement may be accomplished by adjusting the button 36. The other or perpendicular component of movement may be effected by altering the length of the lever 15. More particularly, the lever 15 is formed by two adjustably interconnected parts. One part 49, in the shape of a bell crank, is pivoted on the pin 16, and the other part 50 supports the holder 26, and is formed in one end with a notch 50$^a$ slidably interfitting with the longitudinal arm of the part 49. A cap screw 51 extends loosely through a bore 52 in the part 49 into threaded engagement with the part 50, and has a head 53 seated in a counterbore 54. Sufficient clearance is provided about the screw 51 and between the ends of the parts 49 and 50 at 55 and 56 to permit relative longitudinal adjustment within the desired range.

To provide a fine controllable adjustment, a pin 57 is slidable in a bore 58 within the lateral arm of the part 49 for end engagement with the part 50. A perpendicular pin 59 is slidable in a bore 60 in the part 49 for coacting engagement with the pin 57. The coacting ends of the two pins 57 and 59 are formed with complementary inclined or wedge surfaces 61 and 62 which serve to hold the pins against rotation and to transmit the movement of one to the other. An adjusting screw 63 is threaded into the outer end of the bore 60 in engagement with the pin 59.

When the cap screw 51 is released, the screw 63 may be rotated to effect relatively longitudinal adjustment of the parts 49 and 50. Thereafter, the screw 51 is tightened, and then the screw 63 is further tightened, to lock the parts in adjusted position.

The operation will be apparent from the foregoing description, and briefly stated is as follows:

After insertion of the workpiece 14 through a bushing 29 of proper size and mounting of the workpiece on the carriage 2, the steady rest is located at a desired point along the guides 7 and secured in position by tightening the nuts 13. The set screw 47 is adjusted to contract the bushing into close fitting concentric relationship with the workpiece 14. If necessary, the micrometer nut 39 and the screw 36 are adjusted to lengthen the lever 15 and to rock it so as to bring the axes of the workpiece 14 and the bushing 29 into coincidence with the axis of rotation of the workpiece. After the aforesaid set-up adjustments have been effected, the screws 21, the lock nut 38 and the cap screw 51 are tightened to secure the parts rigidly in position. When so adjusted, the steady rest serves to support the workpiece at a selected point intermediate the ends coaxially with the axis of rotation.

The steady rest is especially useful for long lead screws. The thin-walled adjustable bushing 29 can be contracted snugly and uniformly into engagement with the lead screw, thereby preventing run-out of the screw and causing it to be ground accurately round All of the parts of the steady rest are easily and conveniently adjustable, and adapted to be securely locked in place when the correct setting has been obtained.

I claim as my invention:

1. A steady rest comprising, in combination, a body, a holder mounted on said body for adjustment in two relatively perpendicular directions in a common plane, a yieldable one-piece split bushing mounted in said holder to receive a rotary workpiece, and means for peripherally flexing said bushing to contract said bushing peripherally into close fitting engagement with the workpiece.

2. A steady rest comprising, in combination, a body having a guide slot, a lever having two longitudinally interfitting parts connected for relative adjustment to vary the length of the lever, one of said parts being pivotally mounted in said slot, the other said parts being formed at its free end with a holder, means for clamping said parts in selected adjustment, a slit sleeve supported in said holder, means for contracting said sleeve in said holder, an adjustable abutment engaging said holder for limiting pivotal movement of said lever in one direction, adjustable spring means tending to maintain said lever in engagement with said abutment, and means for clamping said lever in said slot.

3. A steady rest comprising in combination with a support, a body mounted on said support and having a guide slot having flat parallel sides, a pivot pin mounted in said body and extending across said slot, a lever having two longitudinally interfitting parts connected for relative adjustment to vary the length of the lever, one of said parts being pivotally mounted on said pin, the other said parts being formed at its free end with an arcuate holder, means for clamping said parts in selected adjustment, a slit sleeve supported in said holder at three spaced points, a set screw defining one of said points of support and being adjustable to contract and permit expansion of said bushing, an abutment engaging said holder for limiting pivotal movement of said lever in one direction, adjustable spring means tending to maintain said lever in engagement with said abutment, screw means for adjusting said abutment and for securing said abutment in position of adjustment, and a clamping plate interposed in said slot against one side of said lever for securing said lever in position of adjustment.

4. A steady rest comprising, in combination, a body having a guide slot, a lever having two longitudinally interfitting parts connected for relative adjustment to vary the length of the lever, one of said parts being pivotally mounted in said slot, the other of said parts being formed at its free end with a holder, means for clamping said parts in selected adjustment, a slit sleeve supported in said holder, means for contracting said sleeve in said holder, and means for adjusting said lever to locate the axis of said sleeve in a predetermined position.

5. A steady rest comprising, in combination, a body, a lever pivotally mounted on said body and having a holder, a work guide mounted in said holder and consisting of a resilient sleeve formed with a longitudinal split and adapted to embrace a circular workpiece while permitting a portion of the workpiece to project through said split externally of said sleeve, peripherally spaced projections on said holder and contacting said sleeve respectively adjacent the marginal edges of said split and at an intermediate point, one of said projections being adjustable to flex said sleeve whereby to contract said sleeve into peripheral engagement with the workpiece concentrically about the work axis, and means for adjusting the position of said holder to locate said guide concentrically to the workpiece.

6. A steady rest comprising, in combination, a body formed with a slot open longitudinally along one side, a lever pivotally mounted at one end in one end of said slot and projecting from the other end of said slot, said lever consisting of two interfitting parts in longitudinally slidable engagement with each other to permit adjustment of the length of said lever, one of said parts being pivoted in said slot and the other of said parts supporting a work guide, means for clamping said parts rigidly together in relative position of adjustment, stop means for limiting the pivotal movement of said lever in one direction, and spring means acting to maintain said lever against said stop means.

7. A steady rest comprising, in combination, a holder formed with an arcuate segment open at one side, a resilient sleeve disposed in said segment and being split along one side to permit radial contraction and expansion, and a plurality of peripherally spaced projections within said segment for engaging the periphery of said sleeve, one of said projections engaging said sleeve along one margin of the split and another of said projections engaging said sleeve adjacent the other margin of said split and being radially adjustable to contract or permit expansion of said sleeve, and means for adjusting said holder to locate the axis of said sleeve under different conditions of adjustment at a predetermined point.

RUSSELL E. BAUER.